US010710568B2

(12) United States Patent
Vinci et al.

(10) Patent No.: US 10,710,568 B2
(45) Date of Patent: *Jul. 14, 2020

(54) BRAKE CONTROLLER TESTER

(71) Applicants: Ian R. Vinci, Woodstock, NY (US); Peter Vinci, Woodstock, NY (US)

(72) Inventors: Ian R. Vinci, Shandaken, NY (US); Peter Vinci, Shandaken, NY (US); Richard A. Frantz, Hatboro, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/202,390

(22) Filed: Nov. 28, 2018

(65) Prior Publication Data

US 2019/0092310 A1    Mar. 28, 2019

Related U.S. Application Data

(63) Continuation of application No. 15/486,325, filed on Apr. 13, 2017, now Pat. No. 10,196,052.

(60) Provisional application No. 62/326,123, filed on Apr. 22, 2016.

(51) Int. Cl.
| *G06F 11/30* | (2006.01) |
| *B60T 17/22* | (2006.01) |
| *G07C 5/00* | (2006.01) |
| *G07C 5/08* | (2006.01) |

(52) U.S. Cl.
CPC ............ *B60T 17/221* (2013.01); *B60T 17/22* (2013.01); *G07C 5/008* (2013.01); *G07C 5/0825* (2013.01); *G07C 2205/02* (2013.01)

(58) Field of Classification Search
CPC ..................................................... B60T 17/221
See application file for complete search history.

(56) References Cited

U.S. PATENT DOCUMENTS

| 4,482,853 A * | 11/1984 | Bhavsar | H02P 3/24 318/759 |
| 5,149,176 A * | 9/1992 | Eccleston | B60T 7/20 188/1.11 E |
| 10,196,052 B2 * | 2/2019 | Vinci | B60T 17/221 |

\* cited by examiner

*Primary Examiner* — Phuong Huynh
(74) *Attorney, Agent, or Firm* — Law Offices of Michael L. Wise, LLC

(57) ABSTRACT

An apparatus is described that receives a brake control signal from the brake controller of a tow vehicle, and displays characteristics of that brake control signal including commanded brake force. The apparatus includes a data processor, brake simulation circuitry, brake integration circuitry, and display circuitry. The brake simulation circuitry sequentially applies several parallel resistors to the brake control signal in response to commands received from the data processor. These parallel resistors cause the load current on the brake controller to ramp up, mimicking the electrical signature of electric trailer brakes. At the same time, the brake integration circuitry integrates the brake control signal. Lastly, the display circuitry displays an indication of a value of the integrated brake control signal.

11 Claims, 4 Drawing Sheets

BRAKE CONTROLLER TESTER

BACKGROUND OF THE INVENTION

Many newer vehicles that are likely to be used to tow trailers (i.e., tow vehicles) come with integrated brake controllers designed to control the electric brakes on a trailer. Typically, the electric brake signal emanating from these integrated brake controllers is not a DC voltage, but is instead a train of pulses with widths that change with the amount of brake force desired. Stated another way, brake signaling is via pulse-width modulation (PWM). An advantage of PWM is that the electronic brake controller circuitry is simplified and inherently more reliable.

As brake controllers have become more sophisticated, they have added load monitoring circuits to identify a properly connected trailer. Newer brake controllers are not only looking for a load but also the "signature" of a trailer's electric brakes.

Electric trailer brakes use an electromagnet to supply the braking energy to the trailer. Electrically, these brake magnets have the same electrical signature as a typical inductor. When a DC voltage is placed across an inductor, the current rises from zero amps to its final value over a period of time. Most of the newer electric brake controllers are looking for this rising current function as an indication that the electric brakes are properly connected and functioning. The controllers periodically send a short power pulse to the brakes looking for the brake magnet signature. If the signature is lost, the tow vehicle will warn the operator that the trailer braking is either compromised or non-existent. In some cases, the brake controller will stop functioning all together.

Both the pulsed brake signal and the load detection circuitry in modern brake controllers make these devices more effective at accomplishing their tasks, but at the same time, more difficult for a technician to test for proper operation.

SUMMARY OF THE INVENTION

Embodiments of the present invention address the above-identified needs by providing brake testers that are capable of testing modern brake controllers by mimicking the electrical signatures of electric trailer brakes.

Aspects of the invention are directed to an apparatus adapted to receive a brake control signal from a brake controller of a tow vehicle. The apparatus comprises a data processor, brake simulation circuitry, brake integration circuitry, and display circuitry. The brake simulation circuitry is adapted to sequentially apply a plurality of parallel resistors to the brake control signal in response to commands received from the data processor. The brake integration circuitry is adapted to integrate the brake control signal. Lastly, the display circuitry is adapted to display an indication of a value of the integrated brake control signal.

Additional aspects of the invention are directed to an apparatus comprising a tow vehicle, a data processor, brake simulation circuitry, brake integration circuitry, and display circuitry. The tow vehicle comprises a brake controller adapted to generate a brake control signal. The brake simulation circuitry is adapted to sequentially apply a plurality of parallel resistors to the brake control signal in response to commands received from the data processor. The brake integration circuitry is adapted to integrate the brake control signal. Lastly, the display circuitry is adapted to display an indication of a value of the integrated brake control signal.

Even additional aspects of the invention are directed to a method of determining one or more characteristics of a brake control signal from a brake controller of a tow vehicle. A plurality of parallel resistors are sequentially applied to the brake control signal in response to commands received from a data processor. The brake control signal is also integrated. An indication of a value of the integrated brake control signal is displayed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, a "brake control signal" may comprise many different forms. It may, for example, be in the form of a train of pulses like those found when transmitting a signal via PWM.

Figure 1:
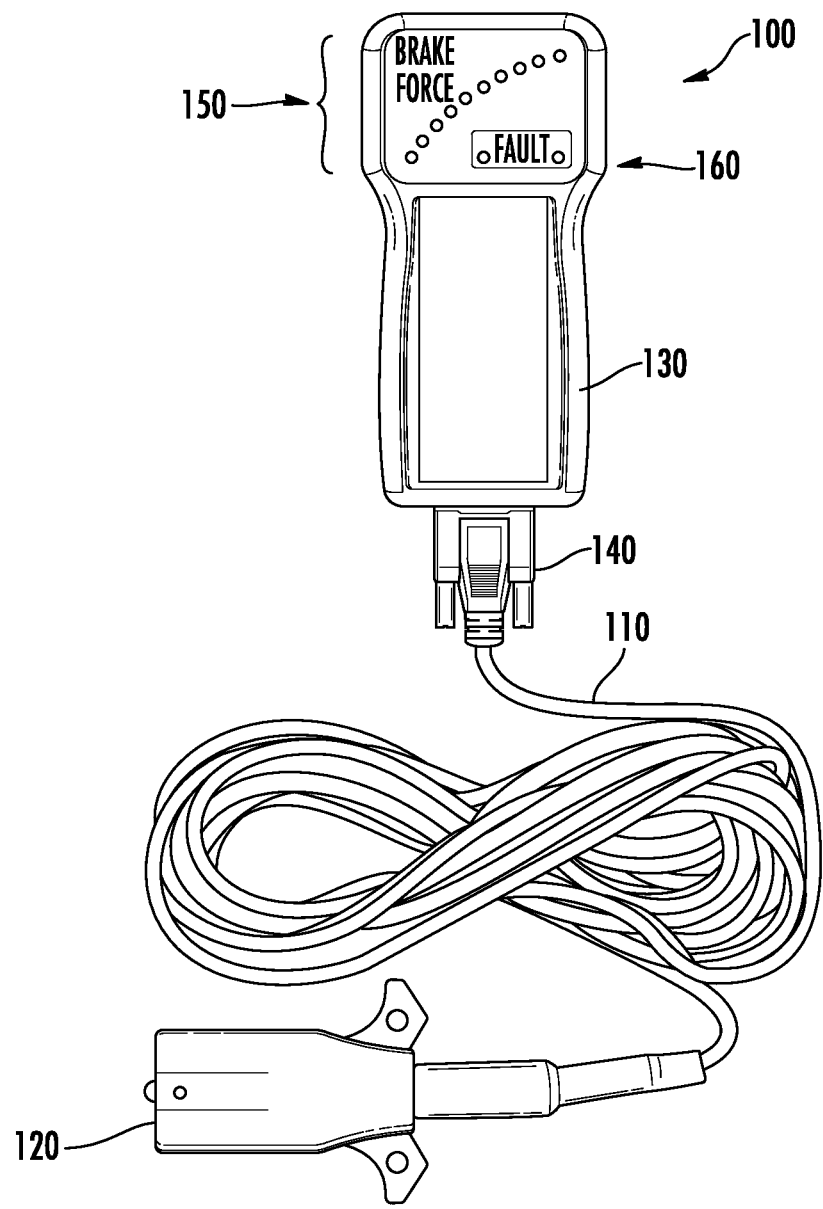
FIG. 1 shows a front elevational view of a brake controller tester in accordance with an illustrative embodiment of the invention.

FIG. 1 shows a front elevational view of a brake controller tester 100 in accordance with an illustrative embodiment of the invention. The brake controller tester 100 includes a cable 110 and a plug 120, which allow the brake controller tester 100 to be connected to a tow-vehicle-side electrical connector of a tow vehicle. The brake controller tester 100 may thereby be placed in signal communication with the brake controller of the tow vehicle. The cable 110 is attached to a head 130 of the brake controller tester 100 via a connector 140.

In operation, the illustrative brake controller tester 100 is operative to perform at least the following three functions:
1. Simulate a properly connected trailer to the tow-vehicle brake controller;
2. Indicate the brake force being commanded by the tow-vehicle brake controller; and
3. Indicate low brake force pulse amplitudes generated by the tow-vehicle brake controller.

Commanded brake force is displayed via a cascading set of light emitting diodes (LEDs) 150. Low brake force pulse amplitudes are indicated by a "fault" LED 160.

Figure 2:
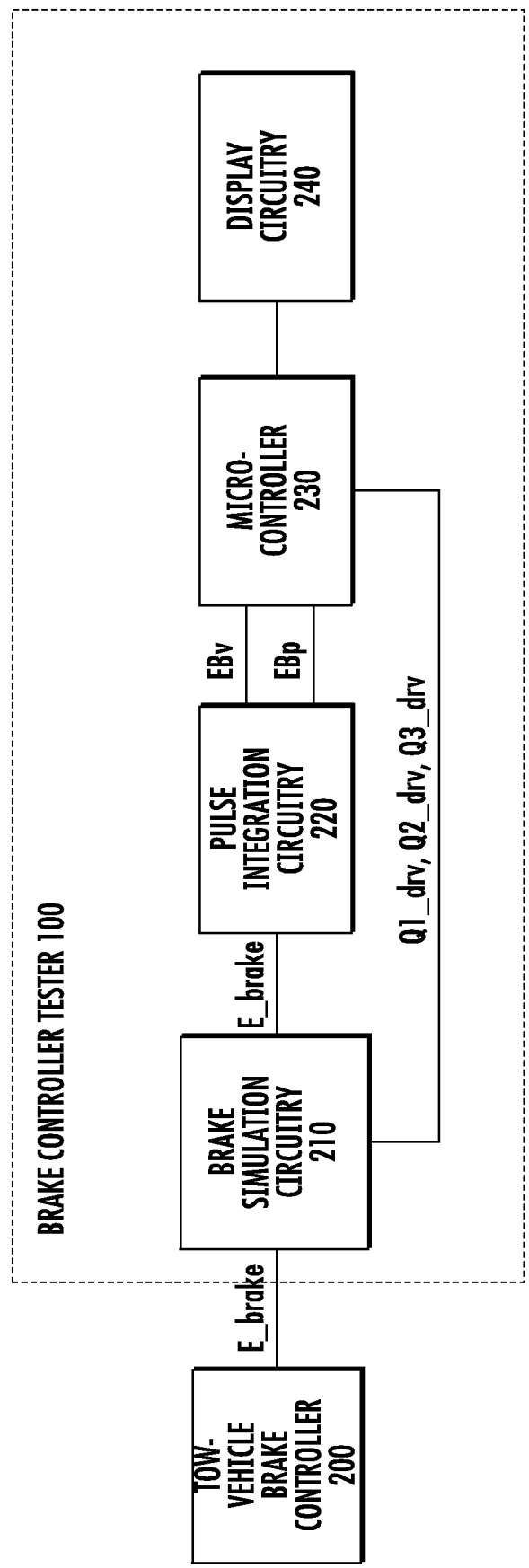
FIG. 2 shows a block diagram of elements within the FIG. 1 brake controller tester.

FIG. 2 shows a block diagram of elements within the brake controller tester 100 that help to accomplish the above-described functions. Brake control pulses, E_brake, from the tow-vehicle brake controller 200 are first sent to brake simulation circuitry 210, and then forwarded to pulse integration circuitry 220. The combination of brake control pulses E_brake combine to form the brake control signal. Two signals from the pulse integration circuitry 220, EBv and EBp, are then sent to a microcontroller 230, which commands display circuitry 240 to display both the brake force being commanded by the tow-vehicle brake controller 200, as well as any faults associated with low brake force pulse amplitudes. The display circuitry 240 includes the LEDs 150 and the LED 160. The microcontroller 230 further sends three control signals, Q1_drv, Q2_drv, and Q3_drv, back to the brake simulation circuitry 210. The microcontroller 230 may be powered by a twelve-volt (12V) signal emanating from the tow vehicle and transmitted by the cable 110.

Figure 3:
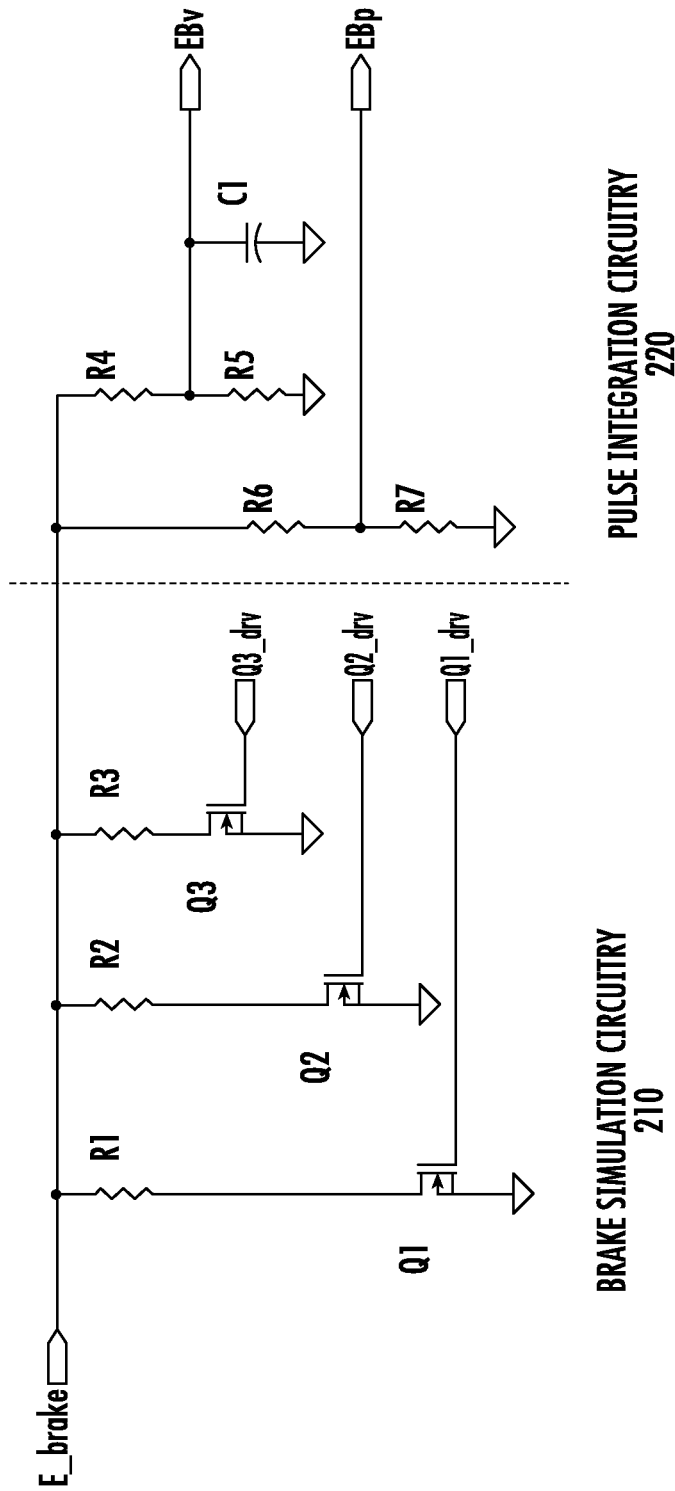
FIG. 3 shows a schematic diagram of circuitry within the FIG. 1 brake controller tester.

FIG. 3 shows a schematic diagram of the circuitry associated with the brake simulation circuitry 210 and the pulse integration circuitry 220 within the brake controller tester 100. As indicated in the Background Section, many modern brake controllers include sophisticated circuitry that periodically probe a trailer's brake system to determine if a trailer is in fact hooked up to the tow-vehicle and functioning properly. Using the brake simulation circuitry 210, the brake controller tester 100 may simulate the signature of a magnetic brake system in an electric brake (i.e., simulate the signature of an inductor) so as to fool the brake controller into believing that a trailer is connected to the tow vehicle rather than the brake controller tester 100.

The brake simulation circuitry 210 emulates the signature of a brake magnet with a set of resistors that are sequentially applied to each brake control pulse E_brake so that the load current felt by the brake controller during the pulse rises over time (i.e., the load current ramps up). As will be seen in the schematic in FIG. 3, the brake controller tester 100 in the present illustrative, non-limiting embodiment applies three resistors R1, R2, R3 in parallel to the line carrying the incoming brake control pulses E_brake. Each resistor R1, R2, R3, in turn, is connected to a ground potential by a respective intervening transistor Q1, Q2, Q3, with each of these transistors Q1, Q2, Q3 controlled by a respective one of the control signals Q1_ drv, Q2_ drv, Q3_ drv coming from the microcontroller 230. The microcontroller 230 is thereby operative to independently turn on and off resistors R1, R2, R3, and is programmed to do just that when detecting brake control pulses E_brake from the tow-vehicle brake controller 200.

Figure 4:
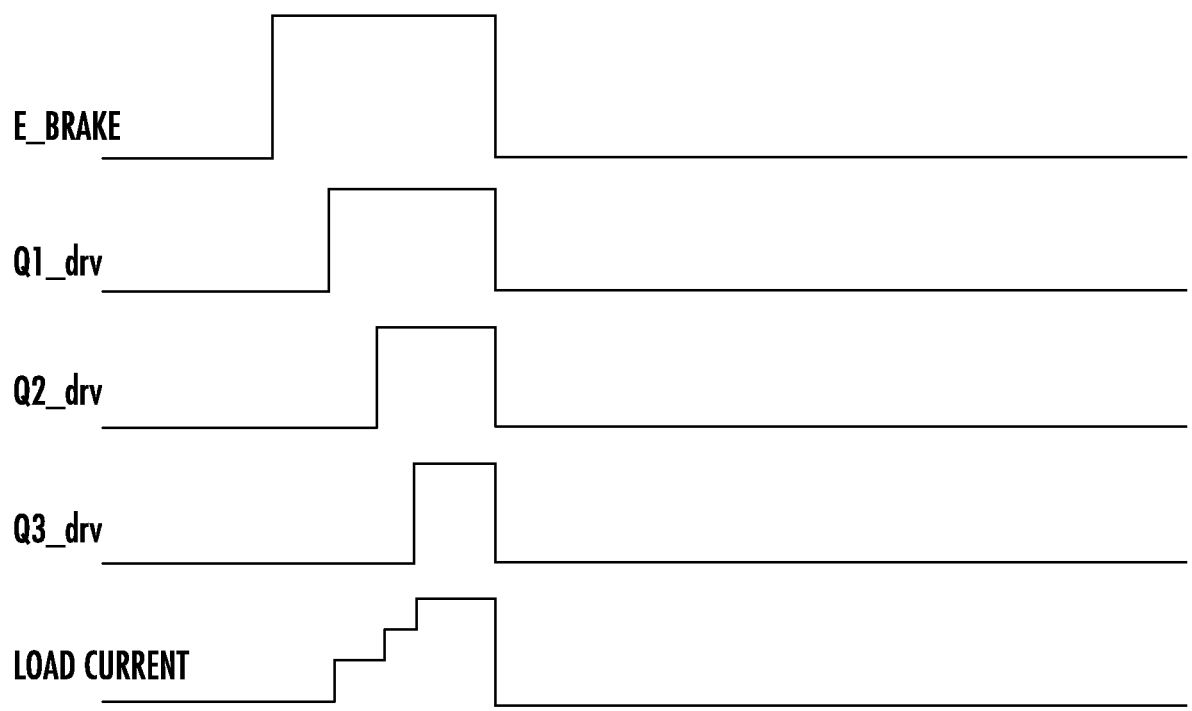
FIG. 4 shows a timing diagram of signals within the FIG. 1 brake controller tester.

The sequential application of resistors R1, R2, R3 to a particular brake control pulse E_brake so as to emulate a magnetic brake is represented in a timing diagram shown in FIG. 4. Resistors R1, R2, R3 are turned on sequentially by the microcontroller when the brake control pulse E_brake is detected by the brake controller tester 100. That is, upon detecting an E_Brake pulse from the tow-vehicle brake controller 200, the microcontroller 230 sequentially turns on the three parallel resistors R1, R2, R3 by sequentially driving control signals Q1_drv, Q2_drv, Q3_drv high so as to sequentially turn on the transistors Q1, Q2, Q3. In one or more illustrative embodiments, resistors R1 and R2 may have similar resistances (e.g., 22 ohms), while resistor R3 may have a substantially smaller resistance (e.g., 3 ohms). A ramping load current is thereby created, simulating the presence of a brake magnet in an electric brake. Once the brake control pulse E_brake has completed, the microcontroller turns off resistors R1, R2, R3 by setting control signals Q1_drv, Q2_drv, Q3_drv low.

The brake controller tester 100 also displays brake force information to the user. There are two signals of interest when determining brake force. The first is the average voltage during application of the brakes. This is an indication of the brake force that a trailer will apply.

As indicated in the Background Section, modern brake controllers use PWM to supply the variable brake force to the trailer brakes. PWM is a method of generating an analog voltage/current in the digital domain. A pulse train is generated, usually with a fixed frequency, where the ratio of on time to total time is used to generate the desired voltage. The pulse train forms the brake control signal. Integrating the PWM signal from the tow-vehicle brake controller 200 over time provides a value indicative of brake force.

The pulse integration circuitry 220 integrates the brake control pulses E_brake emanating from the tow-vehicle brake controller 200 over time with a resistor/capacitor integrator. Referring again to FIG. 3, resistors R4, R5 and capacitor C1 form the integrator, and act together to output the average voltage in the form of the signal EBv. The microcontroller 230 receives the signal EBv and drives the multi-segment LED display 150 in response to the magnitude thereof. The greater the applied brake force, the greater is the magnitude of the signal EBv, and the more LEDs 150 that are lit by the microcontroller 230 and the display circuitry 240. Preferably, all the LEDs 150 are lit when the tow-vehicle brake controller 200 is commanding maximum brake force. The display circuitry 240 thereby displays an indication of the value of the integrated brake control signal.

The brake controller tester 100 also measures the pulse amplitudes of brake control pulses E_brake and determines if those pulse amplitudes are near a specified battery voltage (e.g., 12V). If, for whatever reason, the pulse amplitudes are not close to the specified battery voltage, then even if the brake controller is trying to output 100% braking, the brake force signaled to the trailer may be less than 100%. Such a reduced amplitude could be caused by a weak battery or alternator in the tow vehicle, defective components in the tow-vehicle brake controller 200, or a wiring issue between the tow-vehicle brake controller 200 and the brake controller tester 100. The signal EBp in FIGS. 2 and 3 provides a signal representative of brake pulse amplitude to the microcontroller 230. Resistors R6, R7 act as a voltage divider. If the microcontroller determines that the signal EBp suggests that the brake control pulses E_brake have low pulse amplitudes, the microcontroller 230 commands the display circuitry 240 to cause the fault LED 160 to blink on the face of the brake controller tester 100. The rising and falling edges of the signal EPb also provide triggers to the microcontroller 230 for the activation/deactivation of control signals Q1_drv, Q2_drv, Q3_drv.

While the brake controller tester 100 and the manner in which it functions are entirely novel, the circuit elements therein are conventional and may be readily acquired commercially. Transistors Q1, Q2 may comprise, for example, NDS355AN MOSFET transistors, while transistor Q3 may comprise a FQD13N10LTM MOSFET transistor. Both types of transistors may be purchased from MOUSER ELECTRONICS® (Mansfield, Tex., USA).

The microcontroller 230 comprises one or more data processors (e.g., central processing units (CPUs)) in signal communication with one or more memories and one or more input/output peripherals. Many different microcontrollers may be utilized. For example, in one or more embodiments, the microcontroller 230 may comprise a PIC16F1513 8-bit microcontroller, also available from MOUSER ELECTRONICS®. Once the functions of the microcontroller 230 are understood from the teachings herein, those functions may be programmed by one having ordinary skill in the programming arts. The programming of a microcontroller is, moreover, described in many readily available references, including, as just one example, J. R. Smith, *Programming*

*the PIC Microcontroller with MBASIC*, Newnes, 2005, which is hereby incorporated by reference herein.

The plug 120 on the brake controller tester 100 can take on several different forms so that it may interface with differently configured tow vehicles. The plug 120 may, as just a few examples, be configured as a 7-pin round blade connector, a 6-pin round connector, a flat 5-pin connector, or a flat 4-pin connector. Nevertheless, this list is not intended to be exhaustive and should not be construed as limiting the scope of the invention.

Once the brake controller tester 100 is configured as set forth above, utilization of the apparatus to measure brake force is relatively simple. The plug 120 is simply plugged into a tow-vehicle-side electrical connector of a tow vehicle, and the brake controller tester 100 is monitored inside the vehicle while the brakes on the tow vehicle are modulated. Proportional brake controllers typically use an inertia sensor to detect the amount of brake force that a driver is commanding and automatically try to match that brake force at the trailer brakes. Therefore, it is contemplated that the brake controller tester 100 will be utilized while the tow vehicle is being driven. The cord 110 is therefore preferably long enough to accommodate such a configuration.

The brake controller tester 110 has several advantages. As indicated above, many modern brake controllers must see the electrical signature of an electric trailer brake, or will indicate a fault condition and not function. The brake controller tester 100, and more generally, apparatus in accordance with aspects of the invention, mimics the electrical signature of such a brake without the use of actual magnets and, in doing so, provides a convenient, economical, and compact means by which to test the brake force commanded by a modern brake controller.

It should again be emphasized that the above-described embodiments of the invention are intended to be illustrative only. Other embodiments can use different types and arrangements of elements for implementing the described functionality. For example, while the brake controller tester 100 utilizes one or more microcontrollers, other embodiments may utilize discrete hardware instead. At the same time, alternative embodiments may replace the cable 110 by a wireless connection (e.g., Bluetooth connection). These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. An apparatus adapted to receive a brake control signal from a brake controller of a tow vehicle, the apparatus comprising:
   brake simulation circuitry comprising a plurality of transistors and a plurality of parallel resistors with each of the plurality of transistors connected to a respective one of the plurality of parallel resistors, the brake simulation circuitry operative to sequentially apply the plurality of parallel resistors to the brake control signal by sequentially turning on the plurality of transistors;
   brake integration circuitry comprising an integration resistor in series with an integration capacitor, the brake integration circuitry adapted to integrate the brake control signal; and
   display circuitry comprising a display device, the display circuitry adapted to display an indication of a value of the integrated brake control signal.

2. The apparatus of claim 1, wherein the apparatus further comprises a connector adapted to connect to the tow vehicle.

3. The apparatus of claim 2, wherein the connector comprises a 7-pin round blade connector, a 6-pin round connector, a flat 5-pin connector, or a flat 4-pin connector.

4. The apparatus of claim 1, wherein each of the plurality of transistors is positioned between a respective one of the plurality of parallel resistors and a ground potential for the apparatus.

5. The apparatus of claim 1, wherein the brake control signal comprises a train of pulses.

6. The apparatus of claim 1, wherein the brake simulation circuitry causes a load current on the brake controller to ramp up.

7. The apparatus of claim 1, wherein the brake integration circuitry integrates the brake control signal over time.

8. An apparatus comprising:
   a tow vehicle comprising a brake controller adapted to generate a brake control signal;
   brake simulation circuitry comprising a plurality of transistors and a plurality of parallel resistors with each of the plurality of transistors connected to a respective one of the plurality of parallel resistors, the brake simulation circuitry operative to sequentially apply a plurality of parallel resistors to the brake control signal by sequentially turning on the plurality of transistors;
   brake integration circuitry comprising an integration resistor in series with an integration capacitor, the brake integration circuitry adapted to integrate the brake control signal; and
   display circuitry comprising a display device, the display circuitry adapted to display an indication of a value of the integrated brake control signal.

9. The apparatus of claim 8, wherein the brake simulation circuitry causes a load current on the brake controller to ramp up.

10. A method of determining one or more characteristics of a brake control signal from a brake controller of a tow vehicle, the method comprising the steps of:
    sequentially applying a plurality of parallel resistors to the brake control signal by sequentially turning on a plurality of transistors utilizing brake simulation circuitry comprising the plurality of transistors and the plurality of parallel resistors with each of the plurality of transistors connected to a respective one of the plurality of parallel resistors;
    integrating the brake control signal utilizing brake integration circuitry comprising an integration resistor in series with an integration capacitor; and
    displaying an indication of a value of the integrated brake control signal utilizing display circuitry comprising a display device.

11. The method of claim 10, wherein the step of sequentially applying the plurality of parallel resistors to the brake control signal causes a load current on the brake controller to ramp up.

* * * * *